(12) United States Patent
Gupta et al.

(10) Patent No.: US 9,292,456 B2
(45) Date of Patent: Mar. 22, 2016

(54) SYSTEM AND METHOD FOR DATA SYNCHRONIZATION ACROSS DIGITAL DEVICE INTERFACES

(71) Applicants: Vinay Gupta, Noida (IN); Nir Baruch, Tel-Aviv (IL); Amit Gur, Eyn Vered (IL)

(72) Inventors: Vinay Gupta, Noida (IN); Nir Baruch, Tel-Aviv (IL); Amit Gur, Eyn Vered (IL)

(73) Assignee: FREESCALE SEMICONDUCTOR, INC., Austin, TX (US)

( * ) Notice: Subject to any disclaimer, the term of this patent is extended or adjusted under 35 U.S.C. 154(b) by 425 days.

(21) Appl. No.: 14/028,489

(22) Filed: Sep. 16, 2013

(65) Prior Publication Data

US 2015/0081934 A1 Mar. 19, 2015

(51) Int. Cl.
*G06F 13/00* (2006.01)
*G06F 13/16* (2006.01)
*G06F 1/12* (2006.01)

(52) U.S. Cl.
CPC .............. *G06F 13/1626* (2013.01); *G06F 1/12* (2013.01); *G06F 13/00* (2013.01); *G06F 13/1689* (2013.01); *G06F 13/1673* (2013.01)

(58) Field of Classification Search
CPC ... G06F 1/12; G06F 13/1626; G06F 13/1689; G06F 13/1673
See application file for complete search history.

(56) References Cited

U.S. PATENT DOCUMENTS

| 6,629,218 | B2 | 9/2003 | Cho |
| 7,836,229 | B1 | 11/2010 | Singh et al. |
| 8,271,700 | B1 | 9/2012 | Annem |
| 2008/0082707 | A1 | 4/2008 | Gupta |
| 2009/0060197 | A1 | 3/2009 | Taylor |
| 2012/0020263 | A1 | 1/2012 | Norris |
| 2012/0158729 | A1 | 6/2012 | Mittal |

*Primary Examiner* — Kevin Verbrugge
*Assistant Examiner* — Alan Otto
(74) *Attorney, Agent, or Firm* — Charles E. Bergere

(57) ABSTRACT

A system for synchronizing and re-ordering data transmitted between first and second clock domains associated with first and second device interfaces, respectively, includes a splitter, an arbiter, a transaction manager, and a read data buffer. The splitter receives a parent read request from one or more data input ports of the first device interface and splits it into one or more read requests. The arbiter receives the one or more read requests and selects one of the read requests and transmits it to the transaction manager. The transaction manager allocates an entry to the read request and then the read request is transmitted to the read data buffer. Thereafter, the read data buffer transmits the read request to the second device interface and transmits received response data to the first device interface.

15 Claims, 4 Drawing Sheets the only form in which the present invention may be
SYSTEM AND METHOD FOR DATA SYNCHRONIZATION ACROSS DIGITAL DEVICE INTERFACES

BACKGROUND OF THE INVENTION

The present invention relates generally to data communications, and more particularly, to a system and method for data synchronization across digital device interfaces.

Modern electronic systems include devices that operate on multiple clock signals having varying clock frequencies. For example, a data processing system may include multiple input/output (I/O) devices, a memory, and a microprocessor, all of which operate at different clock frequencies. The I/O devices transmit and receive data from the memory and microprocessor. Since the I/O devices, the memory, and the microprocessor operate at different clock frequencies, data transfer systems are necessary to facilitate data transfer between these devices. For example, a data processing system may include 'N' I/O devices that interface using an advanced extensible interface (AXI) operating at a first clock frequency and a cache memory interface using an eLink interface operating at a second clock frequency. Since the AXI and eLink interfaces operate at different clock frequencies, a data transfer system is needed to facilitate transfers between these interfaces.

A conventional data transfer system includes exchanging handshake signals between different clock domains before transferring actual data. Upon successful completion of the handshake, data transfer is initiated. Typically, the AXI and eLink interfaces send read requests and responses in a random order. Thus, a re-ordering mechanism is required to transmit responses to the AXI interface in a set order. Conventional data transfer systems maintain a static mapping table for the re-ordering mechanism. When the AXI interface sends a read request to the eLink interface, an entry of the read request is made in the mapping table, and upon receiving a response to the read request, the read response is stored in the mapping table. Since read responses are received from the eLink interface in a random order, the responses are transmitted back to the AXI interface when a complete set of responses has been received, corresponding to a batch of read requests.

Although, the conventional data transfer systems successfully transmit data between the AXI and eLink interfaces, there are several shortcomings. The data transfer systems entail exchange of handshake signals before initiating the data transfer, which leads to latency during data processing and negatively affects system performance. Further, using static mapping tables for re-ordering read responses leads to inefficient storage space management.

Therefore, it would be advantageous to have a data transfer system that eliminates the need for exchanging handshake signals, that is fast and efficient, and that overcomes the above-mentioned limitations of conventional data transfer systems.

BRIEF DESCRIPTION OF THE DRAWINGS

The following detailed description of the preferred embodiments of the present invention will be better understood when read in conjunction with the appended drawings. The present invention is illustrated by way of example, and not limited by the accompanying figures, in which like references indicate similar elements.

DETAILED DESCRIPTION OF THE INVENTION

Figure 1:
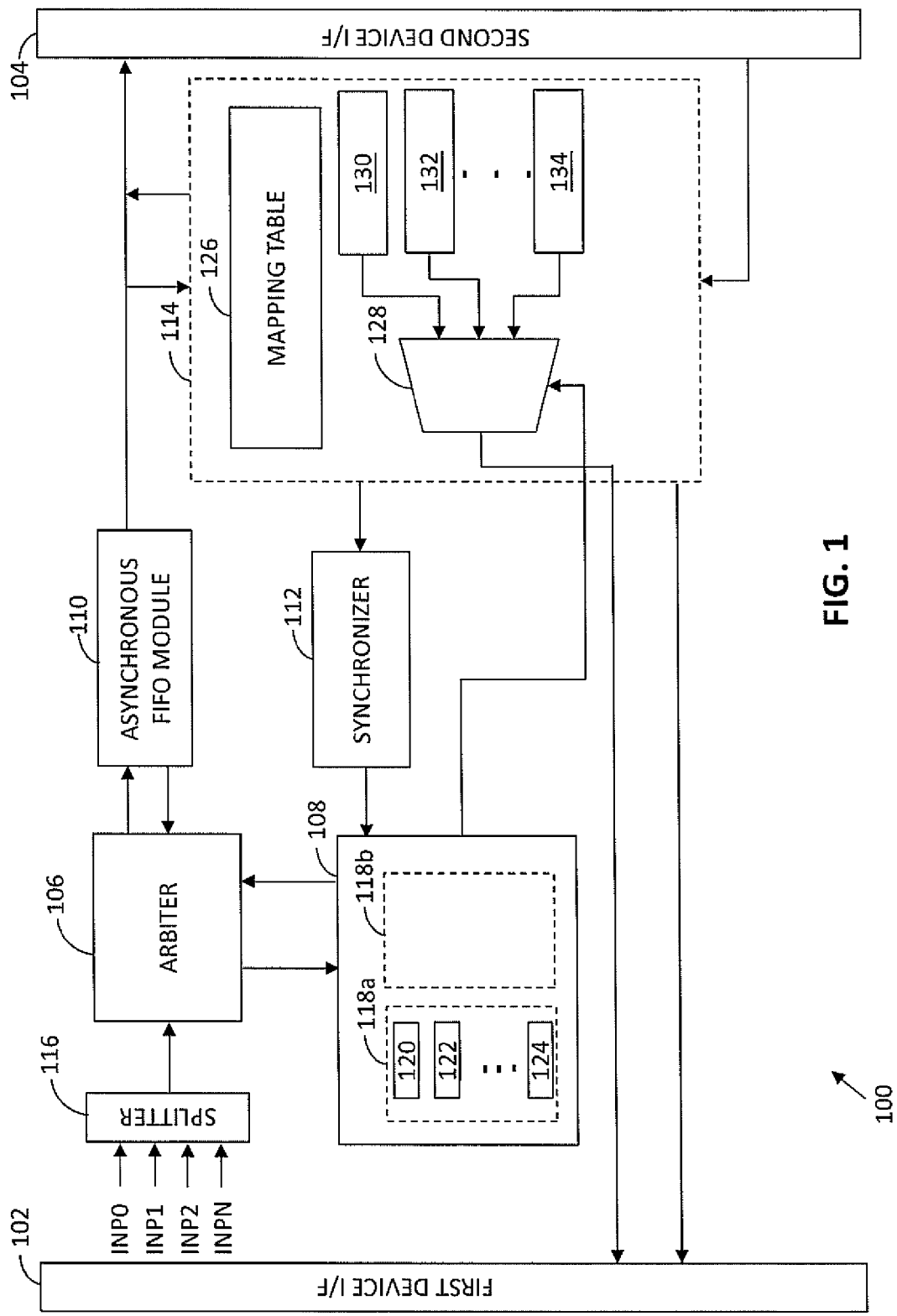
FIG. 1 is a schematic block diagram of a system for synchronizing and re-ordering data in accordance with an embodiment of the present invention.

The detailed description of the appended drawings is intended as a description of the currently preferred embodiments of the present invention, and is not intended to represent the only form in which the present invention may be practiced. It is to be understood that the same or equivalent functions may be accomplished by different embodiments that are intended to be encompassed within the spirit and scope of the present invention. As used herein the terms multiplexer and mux are used interchangeably.

In an embodiment of the present invention, a system for synchronizing and re-ordering data transmitted between first and second clock domains associated with first and second device interfaces, respectively, is provided. The system includes an arbiter, connected to one or more data input ports associated with the first device, that receives one or more read requests, and selects at least one of the read requests based on one or more criteria. A transaction manager, connected to the arbiter, includes one or more entries organized as one or more linked lists. Each linked list corresponds to at least one of the data input ports. The transaction manager allocates a first entry to the selected read request. The first entry is associated with a first one of the linked lists corresponding to the selected read request. Further, the transaction manager determines the first entry associated with a toggle signal, generates a read pointer when the first entry is an initial entry in the first linked list, invalidates the initial entry subsequent to generating the read pointer after receiving an acknowledge signal from the first device interface, and designates an entry subsequent to the initial entry as the initial entry.

The system further includes an asynchronous first-in-first-out (FIFO) module connected to the arbiter and the transaction manager for appending an entry identifier corresponding to the first entry to the selected read request and a read data buffer connected to the asynchronous FIFO module and the transaction manager for receiving the selected read request. The read data buffer generates a tag corresponding to the first entry associated with the selected request, appends the tag to the selected read request, transmits the selected read request to the second device interface, receives a response data from the second device interface, maps the response data with the corresponding entry identifier using the tag associated with the response data and using a mapping table that includes a mapping between the one or more entry identifiers and corresponding tags generated by the read data buffer, transmits the toggle signal corresponding to the entry associated with the response data, and transmits the response data corresponding to the entry to the first device interface.

In another embodiment of present invention, a method for operating a system for synchronizing and re-ordering data transmitted between first and second clock domains is provided. The first and second clock domains are associated with first and second device interfaces, respectively. The system includes an arbiter, a transaction manager, an asynchronous FIFO module, and a read data buffer. The transaction manager includes one or more entries organized as one or more linked lists, where each linked list corresponds to at least one of the data input ports. The method includes the arbiter receiving one or more read requests from one or more data input ports associated with the first device interface. A read request is selected by the arbiter from the one or more read requests based on one or more criteria and transmitted to the transaction manager. The transaction manager allocates a first one of the entries to the selected read request. The first entry is associated with a first one of the linked lists corresponding to the selected read request. Further, the arbiter transmits the selected read request to the asynchronous FIFO module.

An entry identifier corresponding to the allocated entry is appended to the selected read request by the asynchronous FIFO module. The selected read request is then transmitted to the read data buffer. Subsequently, the read data buffer generates a tag corresponding to the entry associated with the selected read request by the read data buffer. The tag corresponds to an addressing scheme associated with the second device interface and the read data buffer stores a mapping table including a mapping between the one or more entry identifiers and corresponding tags generated by the read data buffer. The tag is appended to the selected read request by the read data buffer and the selected read request is thereafter transmitted to the second device interface by the read data buffer.

Further, the read data buffer receives response data from the second device interface. The response data is mapped with the corresponding entry identifier using the tag associated with the response data and the mapping table by the read data buffer. Thereafter, the response data is stored in a memory location corresponding to the entry identifier. A toggle signal corresponding to the entry associated with the response data is transmitted to the transaction manager for indicating receipt of the response data at the read data buffer. The entry associated with the toggle signal is determined by the transaction manager. A read pointer is generated by the transaction manager when the first entry is an initial entry in the first linked list. The read pointer is received by the read data buffer and the response data corresponding to the entry is transmitted to the first device interface.

Various embodiments of the present invention provide a system for synchronizing and re-ordering data transmitted between first and second clock domains associated with first and second device interfaces, respectively. The system includes a splitter for receiving a parent read request from one or more data input ports of the first device interface and splitting it into one or more read requests. Splitting the parent read request into one or more read requests ensures that a bit size of the read requests is aligned with the transaction size of the second device interface. The system further includes an arbiter that receives the one or more read requests and selects a read request from the one or more read requests based on predefined criteria associated with a round-robin scheduling algorithm. The system further includes a transaction manager connected to the arbiter that receives the read request from the arbiter. The transaction manager includes a plurality of entries organized as linked lists, in which each linked list corresponds to a data input port of the one or more data input ports. The linked lists are dynamic whereby a count of entries allocated to a particular linked list may be altered based on a count of read requests received from a corresponding data input port. The dynamic nature of the linked lists facilitates read request traffic management by allocating more entries to the linked list that is receiving higher count of read requests. Additionally, a feature to set an upper limit on the count of entries that can be allocated to a linked list is also provided, thereby eliminating a possibility of a particular data input port capturing considerable amount of resources.

The transaction manager allocates an entry from a linked list to the received read request and transmits the read request to the arbiter which in turn transmits the read request to the asynchronous FIFO module. The asynchronous FIFO module appends an entry identifier to the read request and provides the read request to the read data buffer. The read data buffer receives the read request and attaches a tag to the read request using a mapping table stored therein. The read data buffer then transmits the read request to the second device interface. Subsequent to receiving a corresponding response data, the read data buffer transmits a toggle signal corresponding to the entry associated with the response data to the transaction manager. The transaction manager determines the entry associated with the toggle signal. If the entry is an initial entry of a corresponding linked list, then the transaction manager generates a read pointer for pulling the response data from the read data buffer. Subsequent to receiving the response data, the transaction manager invalidates the initial entry of the linked list and designates a subsequent entry as the initial entry. The above features of generating the read pointer corresponding to the initial entry of a linked list and invalidating and re-designating the initial entry enables the response data to be sent to the first device interface in FIFO order.

Additionally, the system for synchronizing and re-ordering data transmitted between the first and second clock domains does not require an exchange of handshake signals prior to the transfer of data. This saves processing time, which improves the performance of the data processing system.

Referring now to FIG. 1, a system 100 for synchronizing and re-ordering data in accordance with an embodiment of the present invention is shown. The system 100 includes first and second device interfaces 102 and 104, an arbiter 106, a transaction manager 108, an asynchronous FIFO module 110, a synchronizer 112, a read data buffer 114, and a splitter 116. The transaction manager 108 includes first and second linked lists 118a and 118b. The first linked list 118a includes first through third entries 120-124. The read data buffer 114 includes a mapping table 126, a multiplexer or mux 128, and first through third memory locations 130-134.

The splitter 116 is connected to zeroth through Nth data input ports INP0-INPN of the first device interface 102 for receiving a parent read request from either of the zeroth through Nth data input ports INP0-INPN. In an embodiment of the present invention, the first device interface 102 is an advanced extensible interface (AXI) that is associated with a first clock domain. The splitter 116 splits the parent read request into one or more read requests. In an example, the splitter 116 receives a parent read request from the first data input port INP1 and splits the request into three read requests. The splitter 116 ensures that a bit size of the read request that is obtained subsequent to splitting matches with a request transaction size of a read request supported by the second device interface 104. In an embodiment of the present invention, the second device interface 104 is an eLink interface that is associated with a second clock domain. Thereafter, the splitter 116 transmits the read requests to the arbiter 106. The arbiter 106 selects at least one read request based on predefined criteria and transmits the selected read request to the transaction manager 108. In an embodiment of the present invention, the criteria for selecting the read request are associated with round-robin scheduling algorithm.

The transaction manager 108 receives the selected read request from the arbiter 106. The transaction manager 108 includes a plurality of entries, viz., the first through third entries 120-124, organized as one or more linked lists, viz., the first and second linked lists 118a and 118b. In an embodiment of the present invention, each of the first and second linked lists 118a and 118b corresponds to at least one of the plurality of data input ports INP0-INPN. For example, the first and second linked lists 118a and 118b correspond to the zeroth and first data input ports INP0 and INP1, respectively.

The transaction manager 108 allocates an entry to the read request such that the entry is associated with a linked list that corresponds to a data input port associated with the read request. For example, when the transaction manager 108 receives the read request corresponding to the zeroth data input port INP0, it selects the first linked list 118a and allocates the first entry 120 to the read request. Thereafter, the transaction manager 108 transmits the read request to the arbiter 106 and the arbiter 106 transmits the read request to the asynchronous FIFO module 110.

The asynchronous FIFO module 110 appends an entry identifier corresponding to the first entry 120 to the read request received from the arbiter 106 and transmits the read request to the read data buffer 114.

The read data buffer 114 receives the read request with appended entry identifier and generates a tag corresponding to the entry identifier associated with the read request. In an embodiment of present invention, the read data buffer 114 includes a mapping table that stores a mapping between one or more entry identifiers (corresponding to the plurality of entries) and corresponding tags. In an embodiment of the present invention, the tags correspond to an addressing scheme associated with the second device interface 104. The read data buffer 114 reads the tag corresponding to the entry identifier from the mapping table and appends the tag to the read request and transmits the read request with the appended tag to the second device interface 104.

Subsequently, the read data buffer 114 receives a response data from the second device interface 104 corresponding to the transmitted read request and maps the response data with the corresponding entry identifier using the tag associated with the response data to resolve a corresponding entry associated with response data. Thereafter, the read data buffer 114 stores the response data in one of the first through third memory locations 130-134 that corresponds to the entry associated with response data. The read data buffer 114 then transmits a toggle signal corresponding to the entry to the transaction manager 108 and receives a read pointer generated and transmitted by the transaction manager 108 in response to the toggle signal. The read data buffer 114 transmits the toggle signal to the transaction manager 108 by way of the synchronizer 112. The synchronizer 112 synchronizes the toggle signal with respect to the first clock domain associated with the first device interface 102. The read data buffer 114 then transmits the response data corresponding to the read pointer to the transaction manager 108.

In an embodiment of the present invention, the read data buffer 114 may include one or more muxes such as the mux 128. The mux 128 has first through third input terminals connected to the first through third memory locations 130-134, respectively, a select input terminal connected to the transaction manger 108, and an output terminal connected to the second device interface 102. The transaction manager 108 selects one of the first through third input terminals based on the read pointer transmitted to the read data buffer 114 to enable transmission of the response data from one of the first through third memory locations 130-134 to the first device interface 102 by way of the output terminal.

Upon receiving the toggle signal, the transaction manager 108 determines the entry associated with the toggle signal and generates the read pointer when the entry is an initial entry in an associated linked list. In an example, the transaction manager 108 determines the entry corresponding to the received toggle signal to be the first entry 120. Since, the first entry 120 is an initial entry of the first linked list 118a, the transaction manager 108 generates the read pointer for pulling response data from the read data buffer 114. Generating the read pointer when the toggle signal corresponds to the initial entry of the associated linked list allows re-ordering of the response data that is obtained from the second device interface 104 and enables FIFO transmission of the response data to the first device interface 102. Upon generating and transmitting the read pointer, the transaction manager 108 invalidates the initial entry, viz., the first entry 120, and designates an entry subsequent to the initial entry, viz., the second entry 132, as the initial entry, after invalidating the initial entry.

Figure 2A:
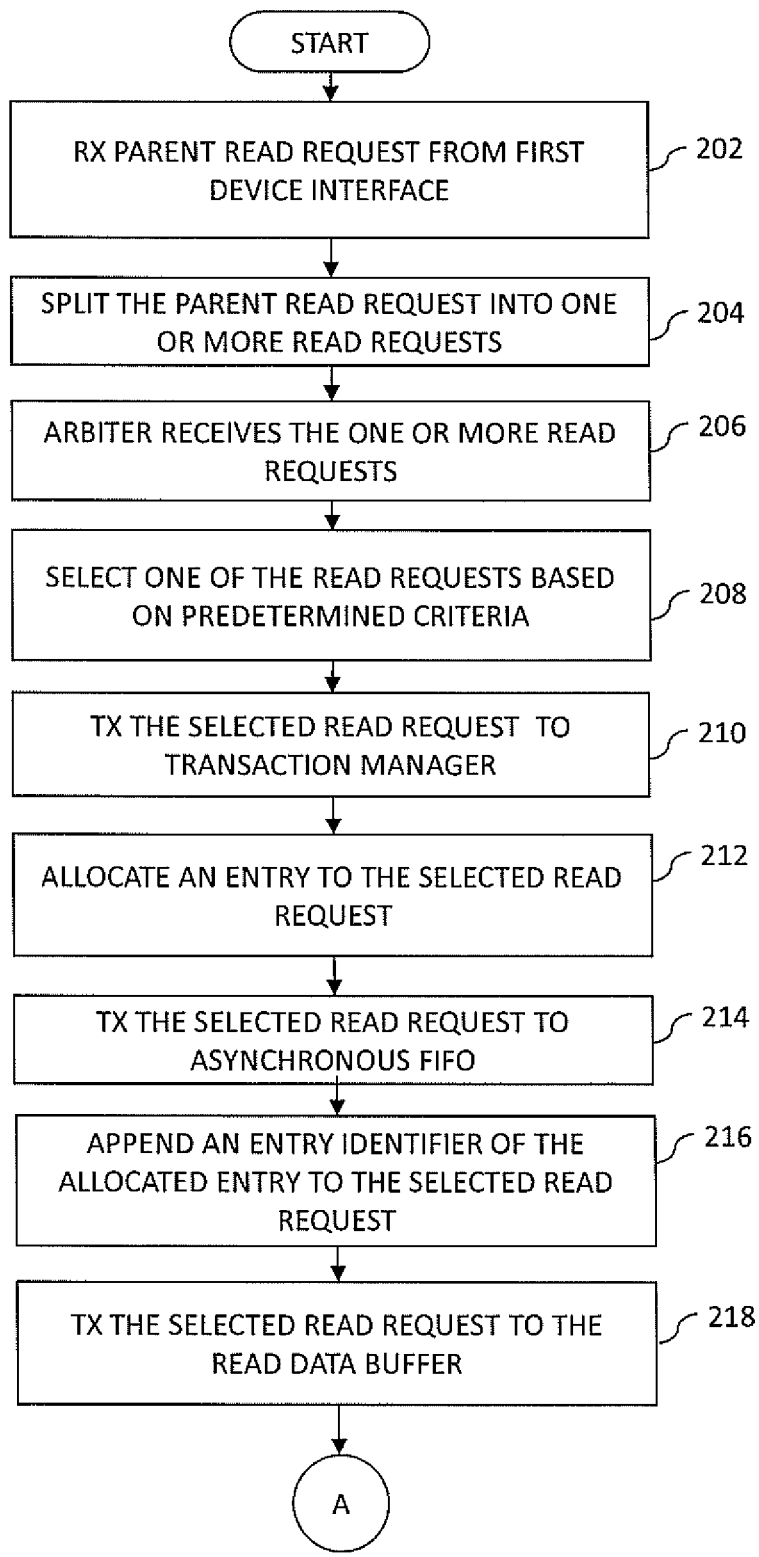
FIGS. 2A, 2B, and 2C are a flow chart of a method for synchronizing and re-ordering data in accordance with an embodiment of the present invention.
Figure 2B:
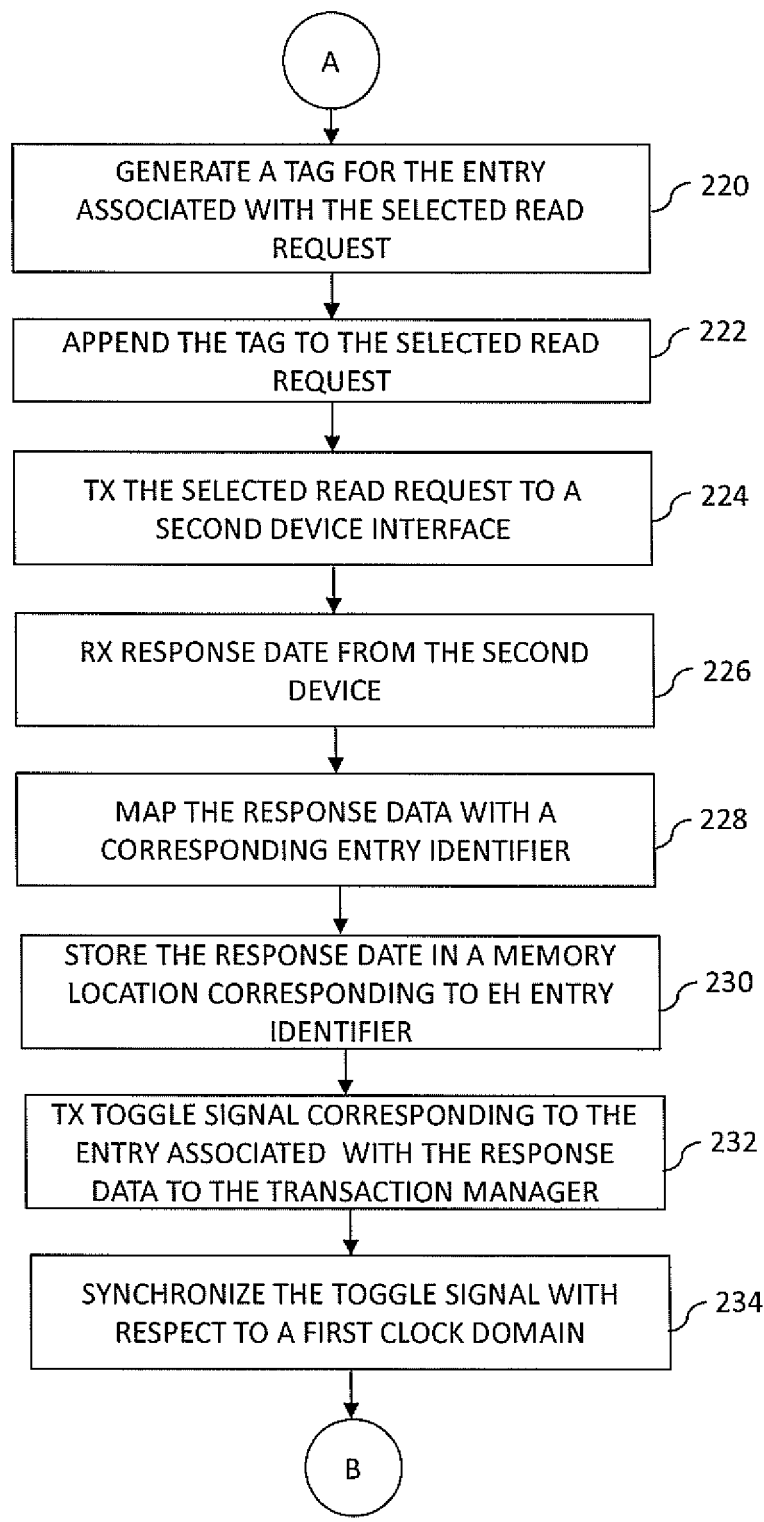
Figure 2C:
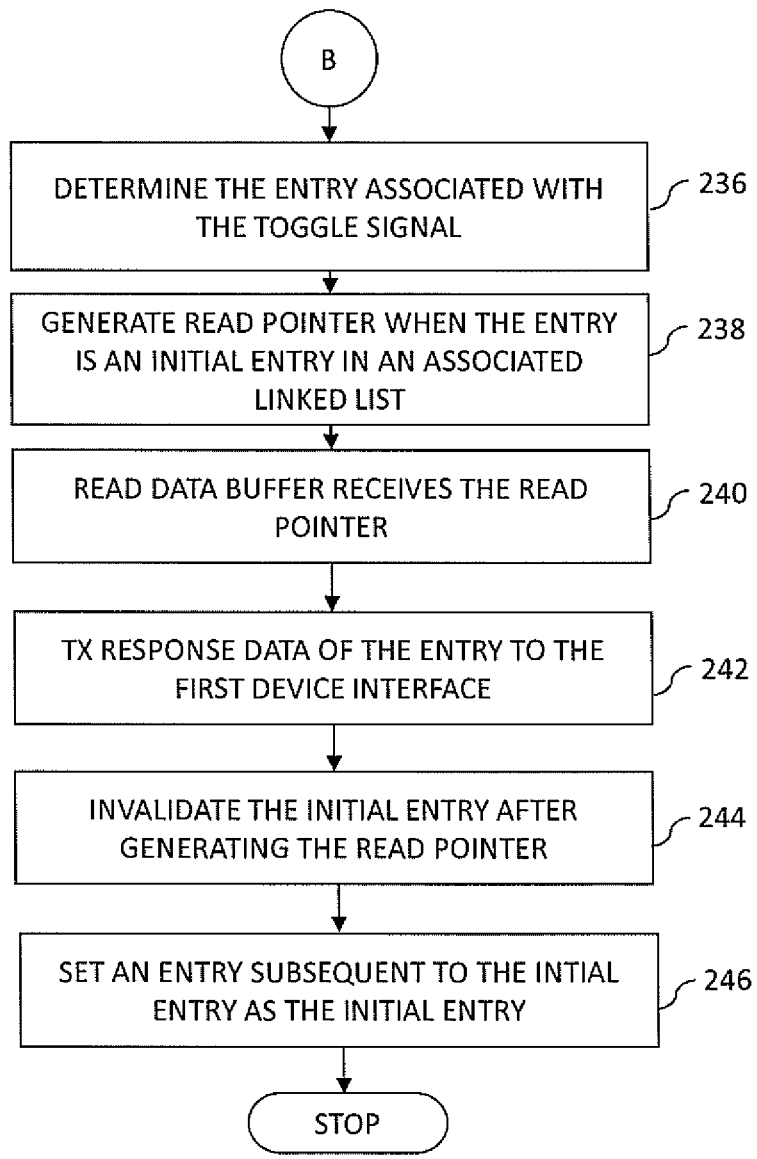

Referring now to FIGS. 2A, 2B, and 2C, a flowchart of a method for operating a system for synchronizing and re-ordering data, in accordance with an embodiment of the present invention, is shown.

At step 202, a parent read request is received from a data input port of the zeroth through Nth data input ports INP0-INPN by the splitter 116. At step 204, the splitter 116 splits the parent read requests into the one or more read requests and transmits them to the arbiter 106. At step 206, the arbiter 106 receives the read requests from the splitter 116. At step 208, the arbiter 106 selects at least one read request based on predefined criteria. In an embodiment of the present invention, the predefined criteria are associated with round-robin scheduling algorithm. At step 210, the arbiter 106 transmits the selected read request to the transaction manager 108. At step 212, the transaction manager 108 allocates an entry of a linked list associated with a data input port corresponding to the received read request as described above in conjunction with FIG. 1. The transaction manager 108 transmits the read request along with the allocated entry information to the arbiter 106.

At step 214, the arbiter 106 transmits the read request and the allocated entry information received from the transaction manager 108 to the asynchronous FIFO module 110. At step 216, the asynchronous FIFO module 110 appends an entry identifier corresponding to the allocated entry to the read request and transmits the read request and appended entry identifier to the read data buffer 114. At step 218, the read data buffer 114 transmits the read request and the appended entry identifier to the read data buffer 114. At step 220, the read data buffer 114 generates a tag corresponding to the entry associated with the read request as described in conjunction with FIG. 1. At step 222, the read data buffer 114 appends the tag to the read request. At step 224, the read data buffer 114 transmits the read request and appended tag to the second device interface 104. At step 226, the response data is received from the second device interface 104 by the read data buffer 114. At step 228, the read data buffer 114 maps the response data with the corresponding entry identifier and resolves the entry associated with the response data.

At step 230, the read data buffer 114 stores the response data in one of the first through third memory locations 130-134 that corresponds to the entry associated with the response data. At step 232, the read data buffer 114 transmits the toggle signal corresponding to the entry associated with the response data to the synchronizer 112. At step 234, the synchronizer 112 synchronizes the toggle signal with respect to the first clock domain associated with the first device interface 102. At step 236, the transaction manager 108 determines the entry associated with the toggle signal. At step 238, the transaction manager 108 generates a read pointer when the entry is the initial entry in the associated linked list and transmits the read pointer to the read data buffer 114. At step 240, the read data buffer 114 receives the read pointer transmitted by the transaction manager 108. At step 242, the read data buffer 114 transmits the response data corresponding to the entry to the first device interface 102. At step 244, the transaction manager 108 invalidates the initial entry subsequent to generating the read pointer. At step 246, transaction manager 108 designates an entry subsequent to the initial entry as the initial entry While various embodiments of the present invention have been illustrated and described, it will be clear that the present invention is not limited to these embodiments only. Numerous modifications, changes, variations, substitutions, and equivalents will be apparent to those skilled in the art, without departing from the spirit and scope of the present invention, as described in the claims.

The invention claimed is:

1. A system for synchronizing and re-ordering data transmitted between first and second clock domains associated with first and second device interfaces, respectively, comprising:
   an arbiter connected to one or more data input ports that receives one or more read requests, and selects at least one read request from the one or more read requests based on a predetermined criteria, wherein the one or more data input ports are associated with the first device interface;
   a transaction manager, connected to the arbiter, that includes one or more entries organized as one or more linked lists, each linked list corresponding to at least one of the one or more data input ports, wherein the transaction manager allocates a first entry of the one of the entries to the selected read request, wherein the first entry is associated with a first linked list of the one or more linked lists corresponding to the selected read request, determines the first entry associated with a toggle signal, generates a read pointer when the first entry is an initial entry of the first linked list, invalidates the initial entry after generating the read pointer, and designates an entry subsequent to the initial entry as the initial entry;
   an asynchronous first-in-first-out (FIFO) module connected to the arbiter and the transaction manager for appending an entry identifier corresponding to the first entry; and
   a read data buffer connected to the asynchronous FIFO module and the transaction manager for receiving the selected read request, generating a tag corresponding to the first entry, appending the tag to the selected read request, transmitting the selected read request to the second device interface, receiving a response data from the second device interface, mapping the response data with the corresponding read request entry identifier using the tag associated with the response data and a mapping table that includes a mapping between the one or more entry identifiers and corresponding tags generated by the read data buffer, transmitting the toggle signal corresponding to the first entry, and transmitting the response data corresponding to the first entry to the first device interface.

2. The system of claim 1, further comprising a splitter connected to the arbiter for receiving a parent read request from the first device interface, and splitting the parent read request into the one or more read requests, wherein a size of the parent read request corresponds to a request transaction size of the first device interface, and a size of each of the one or more read requests corresponds to a request transaction size of the second device interface.

3. The system of claim 1, wherein the tag corresponds to an addressing scheme associated with the second device interface.

4. The system claim 1, further comprising a synchronizer connected to the transaction manager and the read data buffer for synchronizing the toggle signal with respect to the first clock domain when the read data buffer transmits the toggle signal to the transaction manager.

5. The system of claim 1, wherein the read data buffer further includes one or more memory locations, each memory location corresponding to at least one of the one or more entries, and wherein the read data buffer stores the response data in a memory location corresponding to the first entry.

6. The system of claim 5, wherein the read data buffer further includes one or more multiplexers, each multiplexer including one or more input terminals connected to the one or more memory locations, a select input terminal connected to the transaction manager, and an output terminal connected to the second device interface, wherein the transaction manager selects at least one of the one or more input terminals based on the read pointer transmitted to the select input terminal to enable transmission of the response data from the memory location to the first device interface by way of the output terminal.

7. The system of claim 1, wherein the first device interface is an advanced extensible interface (AXI) and the second device interface is an eLink interface.

8. The system of claim 1, wherein the predetermined criteria comprises a round-robin scheduling algorithm.

9. A method for operating a system for synchronizing and re-ordering data transmitted between first and second clock domains, the first and second clock domains being associated with first and second device interfaces, respectively, the system including an arbiter, a transaction manager, an asynchronous first-in-first-out (FIFO) module, and a read data buffer, the transaction manager including one or more entries organized as one or more linked lists, the method comprising:
   receiving one or more read requests by the arbiter from one or more data input ports, wherein the one or more data input ports are associated with the first device interface;
   selecting at least one read request by the arbiter from the one or more read requests based on one or more criteria;
   transmitting the selected read request to the transaction manager by the arbiter;
   allocating a first entry of the one or more entries to the selected read request by the transaction manager, wherein each linked list corresponds to at least one data input port of the one or more data input ports, wherein the first entry is associated with a first linked list of the one or more linked lists corresponding to the selected read request;
   transmitting the selected read request to the asynchronous FIFO module by the arbiter;
   appending an entry identifier corresponding to the first entry to the selected read request by the asynchronous FIFO module;
   transmitting the selected read request to the read data buffer;
   generating a tag corresponding to the first entry by the read data buffer, wherein the tag corresponds to an addressing scheme associated with the second device interface, wherein the read data buffer stores a mapping table including a mapping between the one or more entry identifiers and corresponding tags generated by the read data buffer;
   appending the tag to the selected read request by the read data buffer;
   transmitting the selected read request to the second device interface by the read data buffer;
   receiving a response data from the second device interface by the read data buffer;

mapping the response data with the corresponding entry identifier using the tag associated with the response data and the mapping table by the read data buffer;

storing the response data in a memory location corresponding to the entry identifier by the read data buffer;

transmitting a toggle signal corresponding to the first entry associated with the response data to the transaction manager for indicating receipt of the response data at the read data buffer;

determining the first entry associated with the toggle signal by the transaction manager;

generating a read pointer by the transaction manager when the first entry is an initial entry in the first linked list;

receiving the read pointer by the read data buffer; and transmitting the response data corresponding to the first entry to the first device interface by the read data buffer.

10. The method of claim 9, further comprising receiving a parent read request from the first device interface by a splitter.

11. The method of claim 10, further comprising splitting the parent read request into the one or more read requests by the splitter, wherein a size of the parent read request corresponds to a transaction size of the first device interface, wherein a size of each of the one or more read requests corresponds to a transaction size of the second device interface.

12. The method of claim 9, further comprising invalidating the initial entry subsequent to generating the read pointer by the transaction manager.

13. The method of claim 12, further comprising designating an entry subsequent to the initial entry as the initial entry when the initial entry is invalidated by the transaction manager.

14. The method of claim 9, further comprising synchronizing the toggle signal with respect to the first clock domain by a synchronizer when the read data buffer transmits the toggle signal to the transaction manager.

15. The method of claim 9, wherein the one or more criteria area are associated with round-robin scheduling algorithm.

* * * * *